J. Heilmann.
Shawl Pin &c.
No. 507. Fig. 1. Reissued Nov. 10. 1857
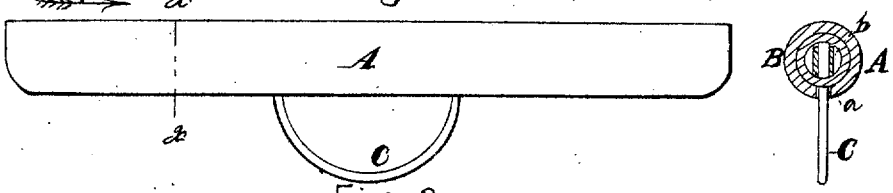
Fig. 2.
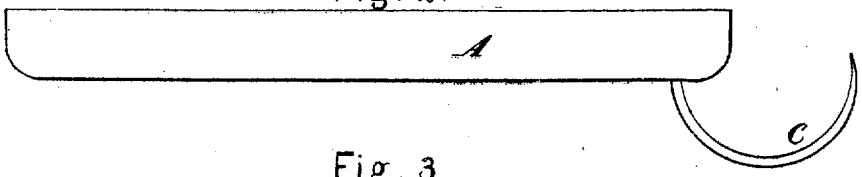
Fig. 3.
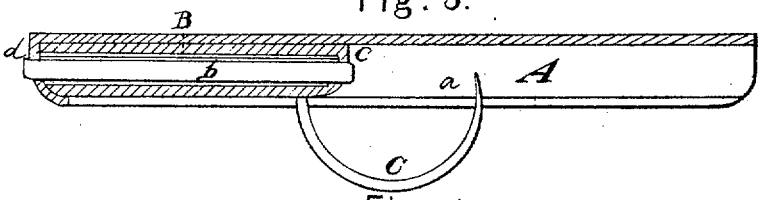
Fig. 4.
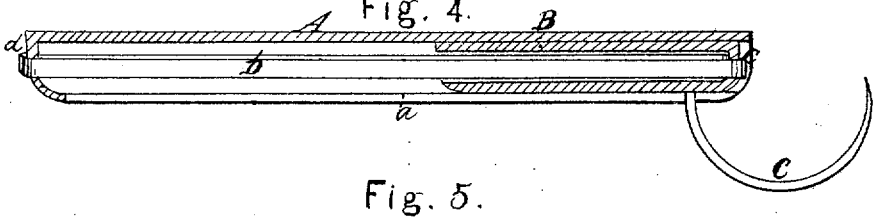
Fig. 5.
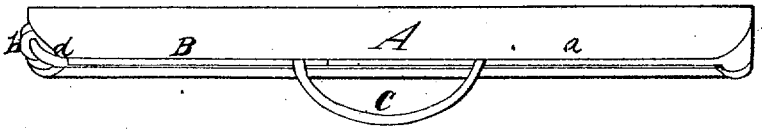
Inventor
J. HEILMANN.

UNITED STATES PATENT OFFICE.

IGNATIUS STURN, OF NEW YORK, N. Y., ASSIGNEE OF J. HEILMANN, OF SAME PLACE.

IMPROVEMENT IN DIAPER-PINS.

Specification forming part of Letters Patent No. 17,857, dated July 21, 1857; Reissue No. 507, dated November 10, 1857.

*To all whom it may concern:*

Be it known that JOSHUA HEILMANN, of the city, county, and State of New York, did invent a certain new and useful Fastening or Pin for Diapers, Shawls, and other Similar Purposes, of which the following is a full, clear, and particular description, reference being had to the accompanying drawings, in which an enlarged view of the invention is shown in the several figures.

Figure 1 is an exterior view of the fastening with the hook or pin retracted within the shield. Fig. 2 is a similar view with the pin thrust beyond the end of the shield ready for insertion in the article to be fastened. Fig. 3 is a longitudinal section with the pin as in Fig. 1; Fig. 4, section with the pin as in Fig. 2. Fig. 5 represents the shield so turned as to show the longitudinal opening or slot therein. Fig. 6 is a transverse section on line *x x* of Fig. 1.

My improved fastening or diaper and shawl pin has for its purpose a secure and cheap mode of shielding the point of the pin, so as to prevent its wounding the child or other person wearing it, and at the same time securing the point from injury, and at the same time making a more perfect fastening.

The invention consists in combining a curved or hooked pin with a case which is made to shield it, and within which it can be retracted so as to shield and protect the point, said point being readily projected beyond the end of the case to be inserted into the article to be fastened. The point of the pin, when within the case, is protected without touching the case, by which it would otherwise be injured, as is now done with those shielded pins heretofore made.

The construction is as follows: A is a shield or outer case of any convenient form, cylindrical or otherwise. This is designated in the several figures by A. It is made with a slit or narrow opening extending from end to end, or nearly so. Within this case A there is fitted a slide, B, having a curved pin or pointed hook, C, affixed to it, and projecting through the opening in the side of the shield or case A, as clearly represented in the figures appended.

It will be noticed that the pin or hook C, while the main portion of it projects beyond the exterior of the shield, has its point within that line, so as to be guarded within the opening, as seen in Figs. 1, 3, 5 of the drawings. The slide, when thrust forward in the shield, projects the pin or hook beyond the end of the shield, as in Figs. 2, 4, so as to be readily inserted into the article to be fastened, and when that is done the shield slides over the point of the pin, as at Fig. 1, and the fastening is completed.

A spring may be used to retract the hook, so as to make it self-operating. This is most distinctly shown in Figs. 3 and 4, in which *b* designates the spring. This can be made of india-rubber or other suitable material. One end of it is fastened to the rear end of the case at *d*, the other end being affixed to the slide at *c*, so that when the point of the hook is forced out beyond the end of the case the spring *b* will be distended, as seen in Fig. 4, and when freed the spring recoils and draws the point of the hook within the case, as in Fig. 3.

Having thus fully described the new shawl and diaper fastener, what I claim therein as the invention of the said JOSHUA HEILMANN, and what I desire to secure by a reissue of the Letters Patent granted to the said HEILMANN, is—

The combination of the sliding curved pin C with the shield or case A, substantially in the manner and for the purposes herein described.

In witness whereof I have hereunto set my hand.

IGNATIUS STURN.

In presence of—
ANDW. KOHLER,
A. H. HOOK.